May 31, 1966     E. O. WANGERIN ETAL     3,253,798
STRIP GUIDE APPARATUS
Filed Nov. 26, 1963
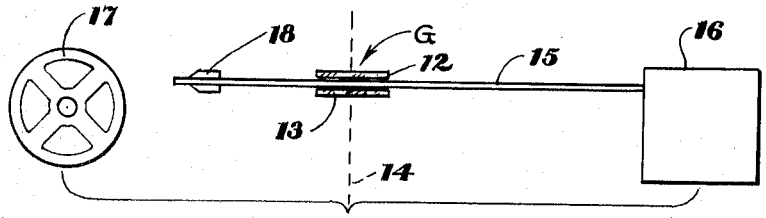
*Fig.1*
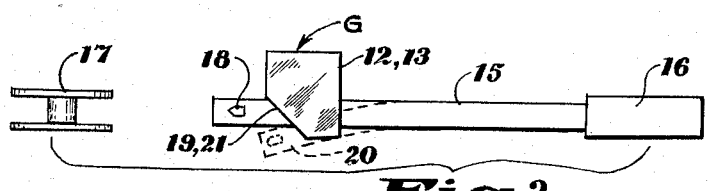
*Fig.2*
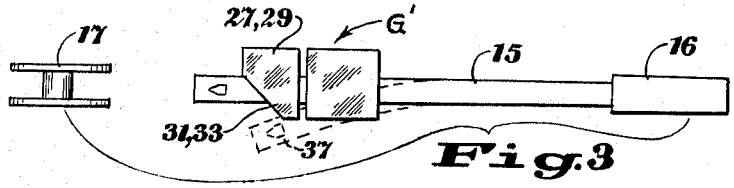
*Fig.3*
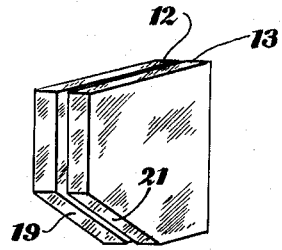
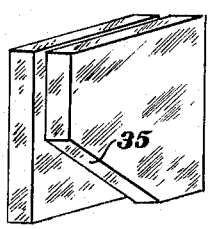
*Fig.5*     *Fig.4*
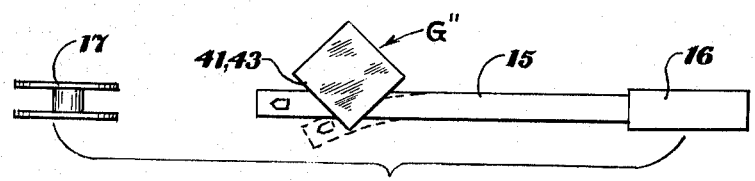
*Fig.6*
Elmer O. Wangerin
Edward B. Schoonmaker
INVENTORS
BY
ATTORNEYS

United States Patent Office 3,253,798
Patented May 31, 1966

3,253,798
STRIP GUIDE APPARATUS
Elmer O. Wangerin and Edward B. Schoonmaker, Rochester, N.Y., assignors to Eastman Kodak Company, Rochester, N.Y., a corporation of New Jersey
Filed Nov. 26, 1963, Ser. No. 326,096
4 Claims. (Cl. 242—76)

The present invention relates to strip handling apparatus, and more particularly of a moving strip around spaced opposed members which serve to position the strip in a predetermined manner relative to the apparatus.

There are a number of types of apparatus in which a strip of material is moved between opposing members during the operation of the apparatus and in which the present invention is useful. Because the invention is particularly useful in photographic apparatus, it is herein described with reference thereto. More specifically it is described with reference to a microfilm reader wherein it is customary to provide means for orienting a film strip in a predetermined manner at one or more points along its path of travel. For example, a film gate comprised of spaced opposed flats between which the film is moved is usually provided in or near the optical axis of the reader for maintaining the film strip in the focus plane of the reader's optical system.

To facilitate the use of microfilm readers, automatic or semi-automatic threading means are often utilized for guiding the film strip through the reader and onto a take-up reel or other storage means. Some of the existing readers having such threading means accept a magazine which serves as a film supply reel during the operation of the reader and which also serves as a storage container for the film strip when the magazine is not in use. A portion of increased thickness, such as a molded-tab surface projection, is usually carried near the leading end of the film strip in such a magazine and serves a two-fold purpose: it provides a member which can be engaged by the threading means to facilitate feeding or drawing the strip through the apparatus, and it prevents the strip from being drawn entirely into the closed magazine during or subsequent to the winding of the strip into said magazine. It should be noted that film strips having such surface projections are also used in apparatus where the tab has still another purpose such as, for example, the tripping of a switch positioned along the path of strip travel.

The use of film strips having these surface projections in conventional microfilm readers presented a problem which had not been completely solved prior to the present invention. The opposing spaced flats in the film gate are usually spaced apart at a distance which allows the film to pass freely between the flats, but which distance is insufficient to allow passage of the projecting tab. Hence the film must be manually removed from the film gate when the tab bearing portion reaches the film gate.

It is known to hold one or both flats of a film gate in operative spaced relation by the use of biasing springs. While a tab attached to the film strip might pass between the flats of such a gate by forcing the flats apart against the spring bias, this arrangement could jam and would have the further disadvantage of wearing or scratching the flats by the projecting tab. This scratching would seriously impair the optical quality of the flats in those instances where the optical axis of the apparatus passes directly through the flats.

Known microfilm readers using film strips which have surface projections incorporated thereon have generally utilized an open type film gate comprised of a pair of members with facing V-notches into which the lateral edges of the strip extend, there being sufficient clearance between the members to allow the projection to pass.

While this device has proved satisfactory in most instances, the present invention comprehends an improved film gate for positively positioning the full viewed surface area of such film strips, particularly where the strip has and appreciable amount of curl.

The present invention avoids the named disadvantages of the prior art by providing a device which, in one of its embodiments, comprises a means for deflecting a portion of a strip carrying a surface projection out and around a gate of fixedly mounted opposed flats between which the strip is intended to move. Because there are no moving parts in this novel device, the deflecting means for the strip and projection attached thereto has the advantage of being relatively inexpensive to manufacture and maintain. Although the invention is described with particular reference to a microfilm reader, many adaptations are readily apparent for use in other and different apparatus without departing from the spirit of the present invention. For example, the present invention can be readily adapted for use in sound recording apparatus wherein a magnetic tape is moved between a recording head and a guide roller.

One object of the present invention is to provide an improved device for guiding a strip of material and for positioning the strip in a predetermined manner.

Another object of the present invention is to provide an improved film gate for photographic apparatus.

Still another object of the present invention is to provide an arrangement for deflecting around a film gate a tab attached to the end of a film strip.

Still other objects and advantages of the present invention will become readily apparent to those skilled in the art from the following description, with reference to the drawings in which like characters denote like parts and in which:

FIG. 1 is a schematic plan view showing the general relationship of parts in a typical apparatus incorporating the device of the present invention;

FIG. 2 is an elevation view illustrating one embodiment of the present invention;

FIG. 3 is an elevation view of another embodiment of the device shown in FIG. 2;

FIG. 4 is an isometric view of the device illustrated in FIG. 2;

FIG. 5 is an isometric view of still another embodiment of the device of the present invention; and FIG. 6 is an elevation view of yet another embodiment of the invention.

FIG. 1 schematically depicts a typical relationship of parts within a microfilm reader in which the strip guide of the present invention can be utilized. Film gate G comprising spaced opposed flats 12 and 13 is arranged in the optical axis of the reader, the axis being indicated by dashed line 14. Film strip 15, having a molded tab 18 projecting from at least one of its planar surfaces, is maintained in a given path by flats 12 and 13 as the strip moves through the optical axis of the reader between supply magazine 16 and take-up reel 17. Where the film gate is located in the optical axis as shown, flats having matching apertures aligned with said axis, or transparent flats, are utilized. However, it is also possible to maintain the film strip in a predetermined manner by locating the flats out of the optical axis, but close enough thereto, to hold the film in the desired position for focusing purposes.

One embodiment of the present invention is shown in FIG. 2, wherein film strip 15 has a tab 18 incorporated near the end of the strip for one of the purposes hereinabove described. As the strip is moved from take-up reel 17 into the supply magazine 16, i.e., returned to the magazine, the tab 18 is unable to pass between the spaced opposed flats 12 and 13 of the film gate G. Inclined edges, 19 and 21 respectively, are beveled in a direction diagonally transverse to the direction of film movement and are disposed to engage the tab 18. The projection strikes one or both of the inclined edges and is deflected out and around the flats as indicated by the position of the dotted line 20. Preferably both of the flats 12 and 13 have beveled edges as shown in FIGS. 2 and 4. However, similar deflected movement is obtained where only one of the flats carries a diagonally transverse beveled edge, such as illustrated at 35 in FIG. 5, especially where the tab 18 projects only from the side of the strip material on which the single beveled edge 35 is located.

Many other embodiments of this novel concept are possible and will be readily apparent to those skilled in the art. For example, one such embodiment of the invention is shown in FIG. 3. Members 27 and 29, each supplemental to a film gate G' and having inner surfaces coplanar with those of the flats of the gate, are disposed adjacent to and on opposite sides of the path of film travel in alignment with said flats. By contact between the tab and the diagonally transverse edges 31 and 33, these supplemental members serve to deflect the portion of the strip having the surface projection out and around the film gate, as indicated by dotted line 37. As previously noted, in any specific apparatus one may well find it necessary or desirable to provide a beveled edge on only one of the flats. It should be understood that many configurations of deflecting means supplemental to the film gate can be readily designed within the scope of the present invention. For example, any structure for deflecting the portion of the strip which carries the surface projection could be utilized. Accordingly, this deflection could be accomplished by a simple U-shaped member disposed adjacent to the gate, with each leg of the member in alignment with a respective flat of the gate so that the strip can pass between the legs of said member. By inclining this member relative to the strip movement with the open end of the U-shaped member nearest the gate, a deflecting surface similar to that shown in the embodiment of FIG. 3 is formed and the strip will be directed from between the legs of the member and around the flats of the film gate.

Still another embodiment of the invention is shown in FIG. 6. Standard rectangular flats, between which the film is maintained in a flat plane, are oriented obliquely in relation to the path of film movement such that the inclined diagonally transverse edges 41 and 43 are presented to deflect the portion of film strip carrying the projecting tab around film gate G''. It should be noted that this arrangement presents deflecting means which are operative for either direction of film travel. However, a similar structural relationship can be readily adapted to the embodiments of the invention above described, with reference to FIGS. 2 and 3 of the drawings.

From the foregoing description, it is evident that the guide and strip handling apparatus described in the various embodiments of the invention provides a means for effectively directing a thickened portion of a strip around narrowly spaced opposed members in any apparatus utilizing moving strip material. Although the invention has been described in detail with particular reference to preferred embodiments thereof, it will be understood that variations and modifications can be effected within the spirit and scope of the invention as described hereinabove and as defined in the appended claims.

Having now particularly described our invention, what we desire to secure by Letters Patent of the United States and what we claim is:

1. In a photographic apparatus for viewing images on an image bearing strip which is driven for longitudinal movement in the apparatus and has a portion of increased thickness adjacent to one end thereof, the combination of:
    (a) a film gate for orienting the strip for the viewing and scanning of images thereon; and
    (b) means operatively associated with the film gate for deflecting said one end of the strip out of the film gate upon engaging said thickened portion as the strip is moved through the film gate,
    (c) whereby movement of the strip in the apparatus is unobstructed by the film gate.

2. The combination in accordance with claim 1 and wherein:
    (a) said film gate comprises a pair of opposed flats between which the strip moves, said flats being spaced from each other a distance which is greater than the thickness of said strip but less than the thickness of said thickened portion, and wherein
    (b) said deflecting means comprises an end guiding surface for said portion, which surface is formed on at least one of said flats and is inclined diagonally transverse of the strip as it moves through the film gate.

3. The combination in accordance with claim 2 and wherein the other of said flats has an end guiding surface which is substantially coplanar with the end guiding surface of the one flat.

4. The combination in accordance with claim 1 and wherein said deflecting means comprises:
    (a) a pair of opposed members which are mounted adjacent to the film gate and between which the strip moves in alignment with the film gate, the facing surfaces of said members being spaced apart a distance which is greater than the thickness of the strip but less than the thickness of said thickened portion, and
    (b) an end guiding surface for said portion, which surface is provided on at least one of said members and is inclined diagonally transverse to the strip moving between the members.

References Cited by the Examiner

UNITED STATES PATENTS

| | | | |
|---|---|---|---|
| 2,001,520 | 5/1935 | Carlson | 226—196 X |
| 2,666,639 | 1/1954 | Frommer | 226—45 X |
| 2,746,120 | 5/1956 | Moos | 28—64 |
| 3,149,394 | 9/1964 | Doyle | 28—64 |

MERVIN STEIN, *Primary Examiner.*

STANLEY N. GILREATH, *Examiner.*

W. S. BURDEN, *Assistant Examiner.*